(12) United States Patent
Niemelä

(10) Patent No.: US 7,978,643 B2
(45) Date of Patent: Jul. 12, 2011

(54) DYNAMIC ADJUSTMENT OF MULTIPLE RECEPTION PATHS

(75) Inventor: Kari Niemelä, Oulu (FI)

(73) Assignee: Nokia Corporation, Espoo (FI)

( * ) Notice: Subject to any disclaimer, the term of this patent is extended or adjusted under 35 U.S.C. 154(b) by 966 days.

(21) Appl. No.: 11/130,656

(22) Filed: May 17, 2005

(65) Prior Publication Data

US 2006/0262741 A1   Nov. 23, 2006

(51) Int. Cl.
*H04B 7/204* (2006.01)
(52) U.S. Cl. ........ 370/319; 370/494; 370/495; 455/436; 455/437; 455/438; 455/439; 455/440; 455/441; 455/442; 455/443; 455/444
(58) Field of Classification Search ................ 455/553.1
See application file for complete search history.

(56) References Cited

U.S. PATENT DOCUMENTS

| | | | | |
|---|---|---|---|---|
| 5,142,279 A | * | 8/1992 | Jasinski et al. ............... | 340/7.22 |
| 5,841,766 A | * | 11/1998 | Dent et al. .................... | 370/321 |
| 5,943,333 A | * | 8/1999 | Whinnett et al. ............. | 370/345 |
| 6,188,699 B1 | * | 2/2001 | Lang et al. .................... | 370/463 |
| 6,356,770 B1 | * | 3/2002 | Ishida .......................... | 455/553.1 |
| 6,405,039 B1 | * | 6/2002 | Koorapaty et al. ........... | 455/434 |
| 7,054,658 B1 | * | 5/2006 | Lobo ............................ | 455/553.1 |
| 2006/0223471 A1 | * | 10/2006 | Dupuie et al. ............. | 455/234.2 |

* cited by examiner

*Primary Examiner* — Patrick N Edouard
*Assistant Examiner* — Matthew W Genack
(74) *Attorney, Agent, or Firm* — Hollingsworth & Funk, LLC

(57) ABSTRACT

A user terminal of a radio system arranged to operate a frequency band subdivided into one or more carrier bands, each of which carries a cyclic set of consecutive time slot. The user terminal comprises a first receiver part adjustable to a defined carrier band, and a second receiver part adjustable to a defined carrier band; wherein the first and the second receiver parts are separately operable. The user terminal comprises also allocation means for allocating to a radio channel at least a first timeslot and a second timeslot, wherein the first timeslot and the second timeslot may belong to different carrier bands. The first receiver part and the second receiver part are adjusted to the carrier bands of the first timeslot and of the second timeslot according to a predetermined scheme. The invented structure improved data throughput of the transmission by providing improved quality of transmission through diversity and added capacity through the multicarrier operation.

17 Claims, 4 Drawing Sheets

DYNAMIC ADJUSTMENT OF MULTIPLE RECEPTION PATHS

FIELD OF THE INVENTION

The present invention relates to telecommunications and especially to a user terminal, a method, a radio system, a network element of a radio system and a computer program product according to preambles of the independent claims.

BACKGROUND OF THE INVENTION

The recent trend in telecommunications has been the convergence of mobile communications and the Internet, resulting in various new technologies, new business models and business opportunities. One of the basic principles in introduction and development of new services has been interoperability. This means that notwithstanding of the communication technologies used for accessing the service, the user experience of the service should be more or less the same. One of the major obstacles in provision of such interoperable services are the different limitations of data throughput in different technologies. The new technologies have been designed from the beginning to support higher data rates, but the prevailing technologies offer often lower data rates. It is clear that the urge for new services happens much faster than the transition to the new technologies, and therefore it is essential that the data throughput of the existing technologies could be improved.

Spectrum space is probably the most limited and precious resource in the industrialized world, so mere addition of new channels to increase the throughput is not possible. The introduction of digital systems brought in a combination of frequency division multiplexing and time division multiplexing. In frequency division multiplexing a separate frequency band is allocated to each tributary channel in common channel. In time division multiplexing two or more lower bandwidth communications channels are combined into a higher bandwidth channel by allocating frequency time slots in turn to each of the lower bandwidth communications. By this manner the data rates over the air interface were significantly improved.

It soon became evident that the throughput of one timeslot was not adequate for new advanced services, and techniques for allocating channels for downlink and uplink in a multislot configuration and for grouping the channels into channel sets were introduced. The multislot configurations were first introduced to the circuit switched operation (High Speed Circuit Switched data, HSCSD) and adapted to the packet switched operation with the emergence of General Packet Radio System (GPRS).

The enhanced data rates for global evolution (EDGE) is an emerging solution to increase the throughput and capacity on the radio link of GSM. The improvement is implemented by introducing a new 8PSK (8 Phase Shift Keying) modulation technique. In the traditional GMSK (Gaussian Minimum Shift Keying) modulation of GMS one transmitted symbol represents one bit. In 8PSK modulation three consecutive bits are mapped onto one symbol, which means that in 8PSK the number of symbols delivered within a defined period of time remains the same as in GMSK, but the data rate is increased by a factor of three.

Both GPRS and EDGE support multi-slot connections, where one or more timeslots can be allocated for one connection. The theoretical maximum speeds of EDGE thus range up to 473 kilobits per second (kbps), but such rates would require a single user taking over all eight timeslots, and coding would be implemented without any error protection. Such connections are not practical and thus very unlikely. Current measured EDGE rates are approximately 60 kbps at cell borders, and approximately 150 kbps on an average, achieved with an asymmetric connection of five downlink slots and one uplink slot. However, as discussed above, for modern real-time applications, higher data rates would be required. Due to the asymmetric nature of Internet usage, increasing the data rates especially in the downlink side would be important

SUMMARY OF THE INVENTION

An object of the present invention is thus to provide a solution for improving the throughput of data transmission in a mobile communication system. The objects of the invention are achieved by a user terminal, a method, a radio system, a network element of a radio system and a computer program product that are characterized by what is stated in the independent claims. The preferred embodiments of the invention are disclosed in the dependent claims.

The invention is based on the idea of equipping the receiving radio unit (for example, a mobile station) with two antennas. The throughput of the reception is increased by a controlled and dynamic adjustment of the reception in each of the receiving paths of the radio equipment. An advantage of the of the invention is that the same structure provides improved quality of transmission through diversity and added capacity through the multicarrier operation. These advantages may be used separately or combined in an optimal manner.

BRIEF DESCRIPTION OF THE DRAWINGS

In the following the invention will be described in greater detail by means of preferred embodiments with reference to the attached [accompanying] drawings, in which.

DETAILED DESCRIPTION OF THE PREFERRED EMBODIMENTS

The present invention is applicable to different mobile communication systems applying time division multiple access where several signals are interleaved in time for transmission over a common carrier frequency. In the following, the embodiments of the invention are described by means of the GPRS/GSM radio system without limiting the invention to this particular mobile communication technology or elements used in description of the embodiment.

Figure 1:
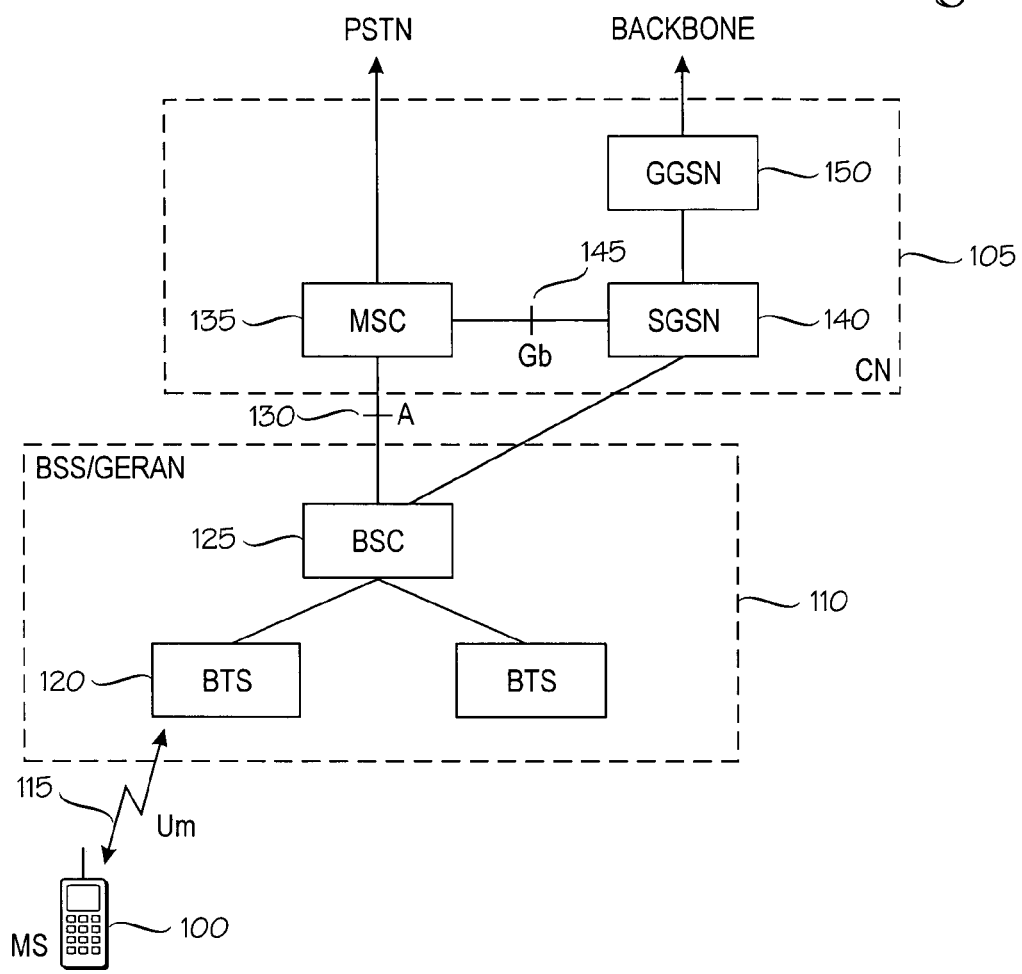
FIG. 1 illustrates the functional architecture of a mobile communication system.

The block chart of FIG. 1 illustrates the functional architecture of a mobile communication system that enables packet data transmission between mobile data terminals and external data networks. FIG. 1 illustrates a mode of operation of the mobile station (MS) 100 connected to the Core Network (CN) 105 via General Packet Radio Service (GPRS) system, the GSM system (Global System for Mobile communications) acting as a Radio Access Network (RAN).

Generally, the basic structure of a GSM network comprises two parts: a base station system (BSS) 110 and a network subsystem (NSS). The GSM BSS communicates with mobile stations (MS) 100 via radio connections over a radio interface Um 115. In the base station system BSS 110 each cell is served by a base transceiver station (BTS) 120. The base station 120 is connected to a base station controller (BSC) 125, which controls the radio frequencies and channels used by the base station. The base station controller BSC 125 is connected over an A-interface 130 to a mobile switching centre (MSC) 135, i.e. as a part of GSM NSS to the core network CN 105 of the system.

The Serving GPRS Support Node (SGSN) 140 keeps track of the location of individual mobile stations and performs security functions and access control. The SGSN 140 is connected to the GSM base station system through the Gb interface 145. The Gateway GPRS Support Node (GGSN) 150 provides interworking with packet data networks, and is connected with SGSNs via an IP-based packet domain PLMN backbone network.

In order to use GPRS services, an MS shall first make its presence known to the network by performing a GPRS attach. This makes the MS available for SMS over GPRS, paging via the SGSN, and notification of incoming packet data. In order to send and receive packet data by means of GPRS services, the MS shall activate the Packet Data Protocol context that it wants to use. This operation makes the MS known in the corresponding GGSN, and interworking with data networks can commence.

A serving GPRS support node 140 (SGSN) is arranged to serve a mobile station by sending or receiving packets via the BSS. Each support node SGSN manages the packet data service in the area of one or more cells in a cellular packet radio network. A mobile station 100, which is in a cell, communicates with the BSS 110 over the radio interface Um 115 and further through the Gb interface 145 with the SGSN 140 to the service area of which the cell belongs. This mode of operation of the MS, when connected to the Core Network via GERAN and the A and/or Gb interfaces, is called A/Gb mode. GERAN refers to GSM/EDGE radio access network which includes GPRS and EDGE technologies.

Figure 2:
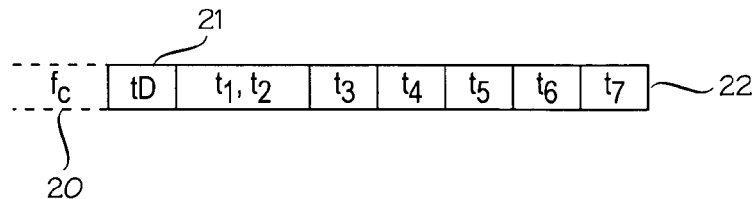
FIG. 2 illustrates a GSM/EDGE TDMA frame.
Figure 3:
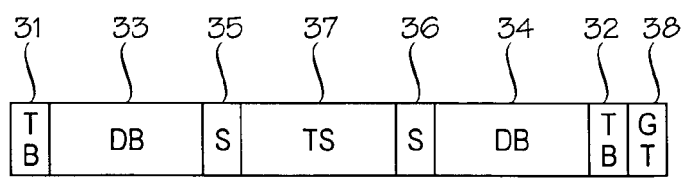
FIG. 3 illustrates a normal burst 20 of GSM/EDGE radio access network.

FIG. 2 illustrates a GSM/EDGE TDMA frame and FIG. 3 illustrates a normal burst of GSM/EDGE radio access network. EDGE supports nine different modulation coding schemes that are optimized for different radio environments. A packet that is transmitted with a coding scheme with less error correction may be retransmitted with a coding scheme with more error correction. This means that the throughput of the transmission gets automatically adjusted to the transmission conditions in the air interface. In GSM/EDGE radio interface the available frequency bands in the uplink and downlink directions are divided into 200 kHz carrier bands 20. Each of these carrier bands 20 are further subdivided into cyclic set of eight consecutive time slots 21 in which the relative position of each time slot can be identified. Such a set of eight time slots is referred to as a TDMA frame 22, and users of a single carrier band thus be considered to share a common TDMA frame.

One time slot 21 carries one GSM/EDGE burst. A burst 30 comprises 3+3 tail bits (marked 31, 32), 57+57 data bits (marked 33, 34), 1+1 type bits (marked 35, 36), 26 training bits (marked 37) and 8,25 bits (30,4 µs) guard time 38. In a GSM network such burst may theoretically carry 114 data bits. In an EDGE network the burst structure is the same, but since each symbol represents three bits, an EDGE burst may theoretically carry 342 data bits. This corresponds to maximum data rate of 68,4 kbps for one time slot.

Figure 4:
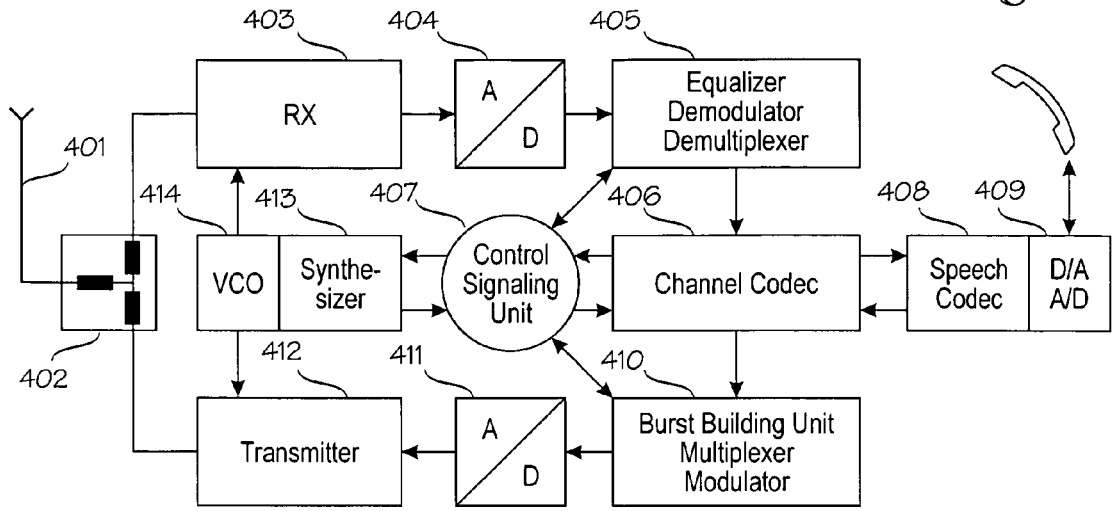
FIG. 4 illustrates a functional configuration of a mobile station.

The block chart of FIG. 4 illustrates a functional configuration of a mobile station. It should be noted that the illustrated units represent logical entities and do not define the implementation of the separate function is the physical realm. In most cases the functional elements are integrated into one or more printed circuit boards with a number of application-specific integrated circuits.

Functionally a mobile station 400 is considered to be divided in two parts. A radio frequency part handles the receiving, transmitting and modulation tasks, and a digital part takes care of data processing, control and signaling functions. Transmission paths to and from an antenna 401 are coupled in an antenna combiner 402. In the receiving path, a receiver 403 typically comprises a front end, a receiving filter arrangement, and a mixer. In the receiver, 403, a received signal is converted onto an intermediate frequency (IF) and passed on to a first analogue-to-digital converter 404. The analogue-to-digital converter 404 converts the IF signal to the data domain and forwards it to a receiver processing unit 405.

The receiver processing unit 405 typically comprises an equalizer, a demodulator, and a demultiplexer. The equalizer is arranged to compensate distortions arising from the multi-path propagation, and the demodulator extracts a bitstream from the received IF signal. The demultiplexer sorts the bitstreams from the different time slots and consecutive frames into corresponding logical channels.

In the receiving path, a channel codec 406 decodes bitstreams coming from the demultiplexer and analyzes them. If the channel codec 406 detects a signaling frame, it passes the frame to a control and signaling unit 407. A speech frame is correspondingly passes on to a speech codec 408. The control and signaling unit 407 is responsible of the control functions of the mobile station, and prepares and processes various signaling messages to be exchanged with the network, or with the user. A speech codec rebuilds 408 specific sounds out of the speech blocks received from the channel codec 406, and passes the digitized speech to a second analogue-to-digital converter 409 for outputting the sounds by means of a loudspeaker.

In the transmitting path, the speech codec 408 compresses digitized speech coming from the second analogue-to-digital converter 409 into defined speech blocks and forwards them to a transmitting processing unit 410. The transmitter processing unit 410 typically comprises a burst building unit, a multiplexer, and a modulator. A burst building unit is arranged to place the bits into a burst structure, whereafter a multiplexer assigns each individual burst to a time slot within a frame. After this the consecutive frames are ready to be imparted onto an intermediate frequency carrier by a digital-to-analogue converter 411.

The transmitter 412 comprises typically a mixer, an amplifier, and output filters. The amplifier is arranged to convert the modulated intermediate frequency carriers to the radio frequencies in the operating frequency band, and the amplifier amplifies the signal to the level required by the current transmission environment. Output filters control the bandwidth of the output such that the transmission does not disturb other channels in the same radio network, or channels in other networks.

A synthesizer 413 provides internal timing references, and a voltage controlled oscillator 414 implements a stable operating frequency in accordance with commands from the control and signaling unit 407. A change in tuning voltage of a voltage controlled oscillator 414 results in predetermined change in input frequency of the receiver 403 or output frequency of the transmitter 412.

Figure 5:
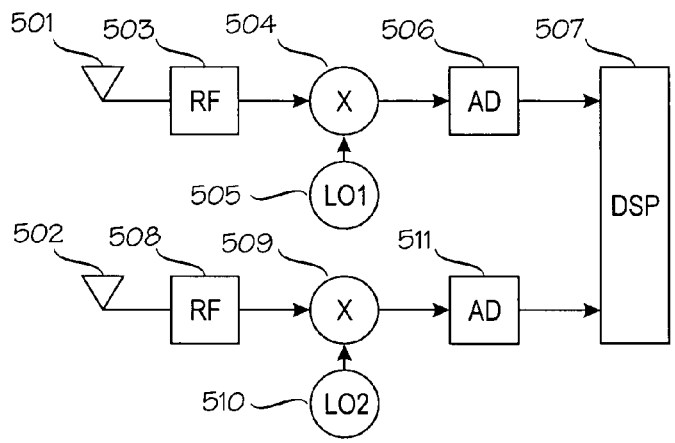
FIG. 5 illustrates an arrangement of elements in the receiving path of a mobile station.

According to the invention, the throughput of the reception is increased by a dynamic adjustment in the receiving side of the radio equipment. In the following the invention is illustrated by means of downlink reception of a mobile station. For a person skilled in the art, it is clear that the invention may be naturally be applied in both transmission directions. FIG. 5 now illustrates an arrangement of elements in the receiving path of a mobile station according to an embodiment of the present invention. The mobile station comprises a first antenna 501 and a second antenna 502. The first antenna 501 is coupled to a first receiver 503 that is arranged to provide conventional front end and filtering to a signal received from the first antenna 501. The antenna signal from the first antenna 501 (later: the first antenna signal) is fed to a first mixer 504. A mixer relates here to a device which, when exited by two input electrical oscillations of different frequencies, gives an electrical output at a frequency which is a linear combination of the input frequencies. The first mixer 504 is coupled to a first oscillator 505. The first oscillator is typically a voltage-controlled oscillator for which a change in tuning voltage results in predetermined change in output. The first oscillator 505 is arranged to feed a signal for mixing with the first antenna signal and thereby producing a controlled change of frequency on the first antenna signal. This is considered as adjusting the receiver path of the first antenna 501 to a defined carrier band. The output of the first mixer 504 is coupled to an analogue-to-digital converter 506 for feeding the resulting first antenna signal to a digital signal processor 507 for further processing, as described in connection with FIG. 4.

Correspondingly, the second antenna 502 is coupled to a second receiver 508 that is arranged to provide conventional front end and filtering to a signal received from the second antenna 502. The antenna signal from the second antenna 502 (later: the second antenna signal) is fed to a second mixer 509. The second mixer 509 is coupled to the second oscillator 510 that is arranged to feed a signal for mixing with the second antenna signal and thereby producing a controlled change of frequency on the second antenna signal. This is considered as adjusting the receiver path of the second antenna 502 to a defined carrier band. The output of the second mixer 509 is coupled to an analogue-to-digital converter 511 for feeding the resulting second antenna signal to a digital signal processor 507 for further processing, as described in connection with FIG. 4.

Figure 6:
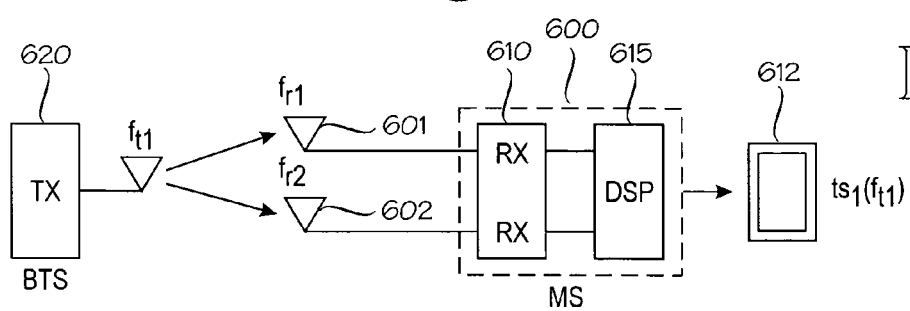
FIG. 6 illustrates the operation of the mobile station of FIG. 5, when the mobile station functions in diversity reception mode.

FIG. 6 illustrates the operation of the mobile station of FIG. 5, when the mobile station is operated in diversity reception mode. Multipath fading is caused by different delays among the alternative paths between a mobile and a base station. In diversity reception a single output signal is derived from a combination of, or selection from, a plurality of transmission channels or paths. In the diversity reception mode, the receiving frequency $f_{r1}$ of the first receiving path 601 and the receiving frequency $f_{r2}$ of the second receiving path 602 of a mobile station 600 are adjusted to one carrier frequency $f_{t1}$ of the base station 620. Due to the spatial difference of the first antenna 601 and the second antenna 602, the delays between the paths of these antennas will be different, and it is unlikely that a fade at one antenna will be experienced at the other antenna at the same instant. The receiver 610 of the mobile station 600 feeds signals from both of the receiving paths to the receiver processing unit 615, where a common resulting signal is derived on the basis of both of the signals. The output of the first and the second receiving paths 601, 602 thus contribute to the reception of the same information, and the quality of the reception is highly improved. In FIG. 6 the result is illustrated by means of two timeslots in the carrier frequency $f_{t1}$ of the base station, and dual framing of the timeslots illustrates that reception is improved by means of diversity.

Figure 7:
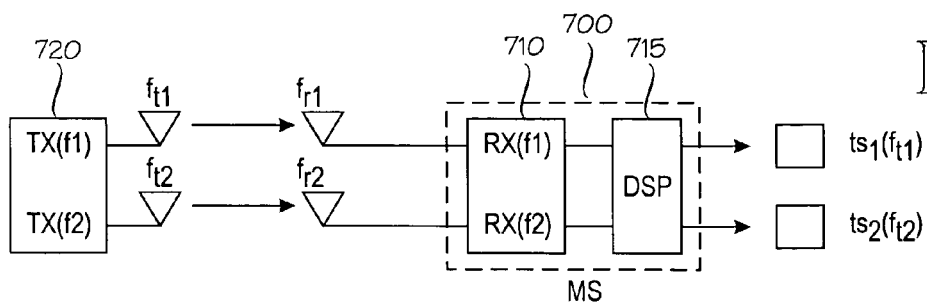
FIG. 7 illustrates the operation of the mobile station of FIG. 5, when it is operated in a dual carrier mode.

FIG. 7 illustrates the operation of the mobile station of FIG. 5, when it is operated in a dual carrier mode. In dual carrier mode a receiving frequency $f_{r1}$ of the first receiving path 701 is adjusted to a first transmission frequency $f_{t1}$ of the base station 720 and a receiving frequency $f_{r2}$ of the second receiving path 702 of a mobile station 700 is adjusted to a second transmission frequency $f_{t2}$ of the base station 720. The receiver 710 of the mobile station 700 feeds signals from both of the receiving paths to the receiver processing unit 715, where a resulting signal is derived from both of the signals. The outputs of the first and the second receiving paths 701, 702 contribute the reception of different information. Due to the difference in the frequency domain, the delivery of information in the air interface may coincide in time. In FIG. 7 the result is illustrated by means of two timeslots of different carrier frequencies $f_{t1}$ and $f_{t2}$ of the base station. Single framing of the timeslot illustrates that reception is not improved by means of diversity.

Figure 8:
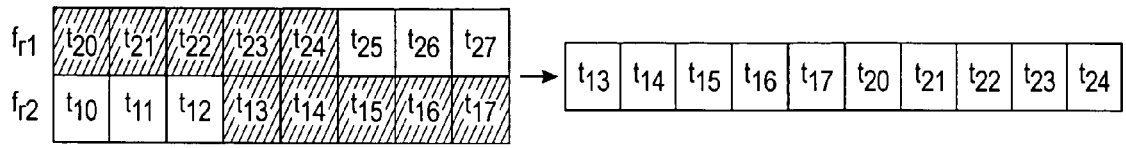
FIG. 8 illustrates dual carrier mode operation of a mobile station.

It is thus seen that by controlled and dynamic adjustment of reception on the two receiving paths, the throughput of the transmission can be significantly improved. Since in dual carrier mode the delivery of information in the air interface may coincide in time, at one moment there may be several transmissions, each related to one and same connection. This is illustrated in FIG. 8, where TDM frames of the first antenna signal and the second antenna signal of a presently embodied mobile station are shown. In the dual carrier mode the first antenna signal is adjusted to a first carrier frequency ($f_{r1}\hat{}=f_{t1}$) and the second antenna signal is adjusted to a second carrier frequency ($f_{r2}\hat{}=f_{t2}$). In the current embodiment of the invention, at connection setup the mobile station and the base station system may allocate to a connection timeslots t13, t14, t15, t16, t17, t21, t22, t23, t24, t25, shown with shadowing in FIG. 8. The timeslots may then be combined to provide an output of altogether ten timeslots within the time interval of one TDM frame for one connection. Naturally this requires the computing capacity of the processing unit and the codecs need to be able to implement the increased number of operations arising from the increased number of transmitted information at the same time period.

Figure 9:
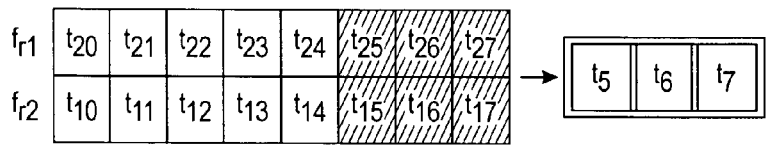
FIG. 9 illustrates diversity reception mode operation of a mobile station.

On the other hand, when the timeslots of the connection do not overlap, i.e. no time coincidences exist, the first and second receiving paths may be used to improve the quality of reception by means of diversity. FIG. 9 illustrates TDM frames of the first antenna signal and the second antenna signal of a presently embodied mobile station. When the receiving frequency $f_{r1}$ of the first antenna signal is adjusted to the same first carrier frequency $f_{t1}$ as the receiving frequency $f_{r2}$ of the second antenna signal ($f_{r1}=f_{r2}$), a resulting signal may derived as a combination or a selection of both of the signals. The reception of timeslots t15, t16, t17 is improved, and thereby the number of required retransmissions is reduced. This leads to notable increase in the throughput of the reception.

Figure 10:
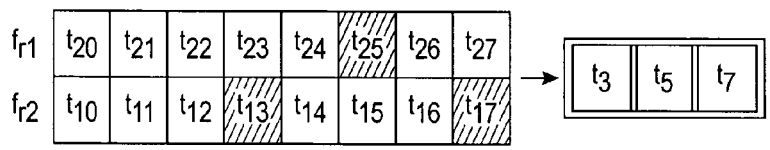
FIG. 10 illustrates antenna hopping mode operation of a mobile station.

A special aspect of the diversity mode is the antenna hopping mode, illustrated in FIG. 10. In diversity reception, both receiving paths receive concurrently and a resulting signal is computed on the basis of the signals from each of the receiving path. In antenna hopping, both receiving paths are adjusted to the first carrier frequency $f_{t1}$ of the base station, but only one at the time is activated for reception. FIG. 10 illustrates again TDM frames of the first antenna signal and the second antenna signal of a presently embodied mobile station. The receiving frequency $f_{r1}$ of the first antenna signal is basically adjusted to the same transmission frequency $f_{t1}$ of a first carrier frequency as the receiving frequency $f_{r2}$ of the second antenna signal ($f_{r1}=f_{r2}$). On the basis of measured transmission conditions in both receiving paths, or according to a predefined algorithm, either of the receiving paths is activated at a time. In FIG. 10 this is illustrated by reception of timeslot t15 passing through the first receiving path, and timeslots t13, and t17 passing through the second receiving path. The resulting signal is derived as a combination the signals from the first and the second receiving path. Like diversity reception, antenna hopping improves the quality of the reception through improved signal power and space diversity. This reduces the number of required retransmissions and thereby optimizes the data throughput of the reception. The power consumption is, however, considerably less than in diversity reception.

Figure 11:
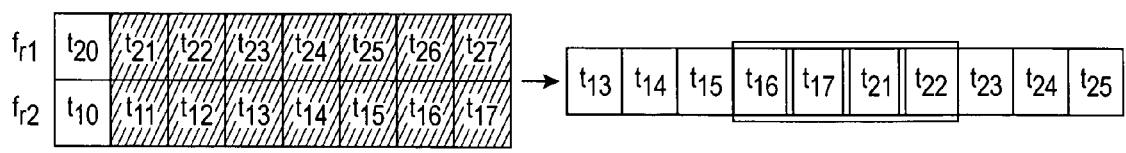
FIG. 11 illustrates a further optimization of the data throughput in the embodied mobile station.

FIG. 11 illustrates a further optimization of the data throughput in the embodied mobile station. FIG. 11 shows TDM frames of the first antenna signal and the second antenna signal of a mobile station according to the presently embodied mobile station. At connection setup the mobile station and the base station system may allocate to a connection timeslots t13, t14, t15, t16, t17, t21, t22, t23, t24, t25, shown with shadowing in FIG. 11. From FIG. 11 it can be seen that timeslots t16, t17 in the first receiving frequency $f_{r1}$ of the first antenna signal do not coincide in time with the timeslots t21, t22, t23, t24, t25 in the second receiving frequency $f_{r2}$ of the second antenna signal. Correspondingly, timeslots t21, t22 in the second receiving frequency $f_{r2}$ of the second antenna signal do not coincide in time with the timeslots t13, t14, t15, t16, t17 in the first receiving frequency $f_{r12}$ of the first antenna signal. This means that at times when the timeslots of each receiving paths do not coincide, the reception in the first receiving branch and the second receiving branch may be adjusted to the same transmission frequency for diversity reception ($f_{r1}=f_{r2}$). At times when the timeslots of each receiving paths do coincide, the receptions in the first receiving path and the second receiving path are adjusted to separate carriers in order to provide multicarrier reception. Such operation provides a nearly optimal combination for improving the data throughput of the transmission.

Figure 12:
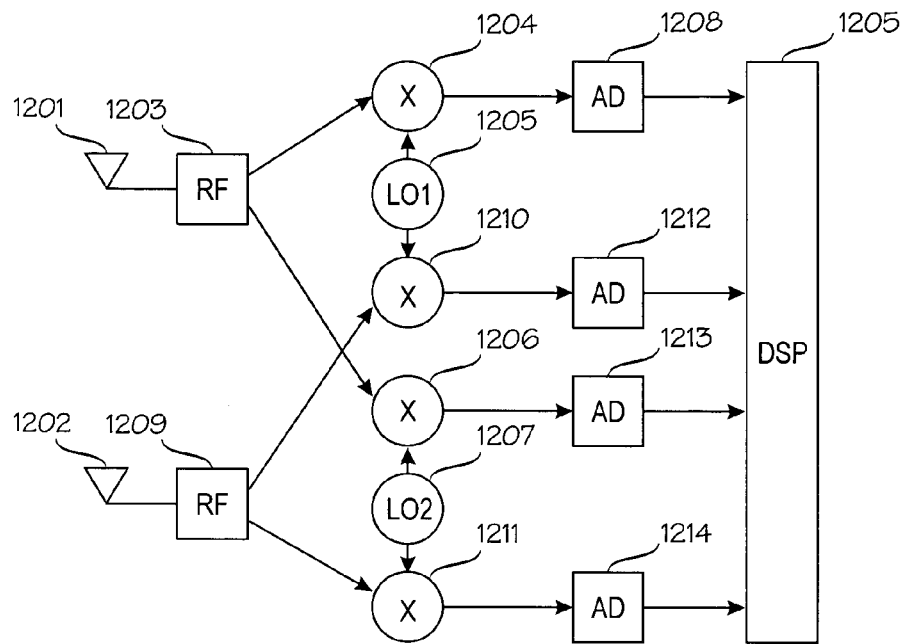
FIG. 12 illustrates a further improved arrangement of elements in the receiving path of a mobile station.

FIG. 12 illustrates a further improved arrangement of elements in the receiving path of a mobile station according to an embodiment of the present invention. The mobile station comprises a first antenna 1201 and a second antenna 1202. The first antenna 1201 is coupled to a first receiver 1203 that is arranged to provide conventional front end and filtering to a signal received from the first antenna 1201. The primary antenna signal from the first antenna 1201 (later: the first primary antenna signal) is fed from the first receiver 1203 to a first mixer 1204. The first mixer 1204 is coupled to a first oscillator 1205 that is arranged to feed a signal for mixing with the first primary antenna signal and thereby produce a controlled change of frequency on the first antenna signal.

The secondary antenna signal from the first receiver 1203 (later: the first secondary antenna signal) is coupled to a third mixer 1206. The third mixer 1206 is coupled to a second oscillator 1207 that is, in turn, arranged to feed a signal for mixing with the first secondary antenna signal and thereby produce a controlled change of frequency on the first secondary antenna signal.

The second antenna 1202 is coupled to a second receiver 1209 that is arranged to provide conventional front end and filtering to a signal received from the second antenna 1202. The primary antenna signal from the second antenna 1202 (later: the second primary antenna signal) is fed from the second receiver 1209 to a second mixer 1210. The second mixer 1210 is coupled to the first oscillator 1205 that feeds a signal for mixing with the second primary antenna signal and thereby produces a controlled change of frequency on the second primary antenna signal. The secondary antenna signal from the second receiver 1209 (later: the second secondary antenna signal) is coupled to a fourth mixer 1211. The fourth mixer 1211 is coupled to a second oscillator 1207 that is arranged to feed a signal for mixing with the second primary antenna signal and thereby produce a controlled change of frequency on the second secondary antenna signal.

The outputs of the mixers 1204, 1206, 1210, 1211 are coupled through analogue-to-digital converters 1208, 1212, 1213, 1214 for feeding the resulting antenna signals to a digital signal processor 1215 for further computing, as described in connection with FIG. 4. It can be seen that the arrangement provides a hybrid system where both the capacity and sensitivity of the reception may be simultaneously enhanced. The primary and secondary signals of receiving paths may be combined, correspondingly, for diversity reception. The configuration also allows intelligent antenna hopping in either of the receiving paths. Additionally, by dynamically adjusting the local oscillators to different carriers, and thereby adding the number of timeslots available for a connection, a considerable increase in the throughput of transmitted data may be achieved.

The embodiment of FIG. 12 represents an advanced stage of a progressive procedure utilizing the concept of the present invention. It is, however, a multiplication of the basic structure, and therefore provides a natural way to reach such stage gradually. Such simple evolution path is a clear advantage of the invented solution.

Figure 13:
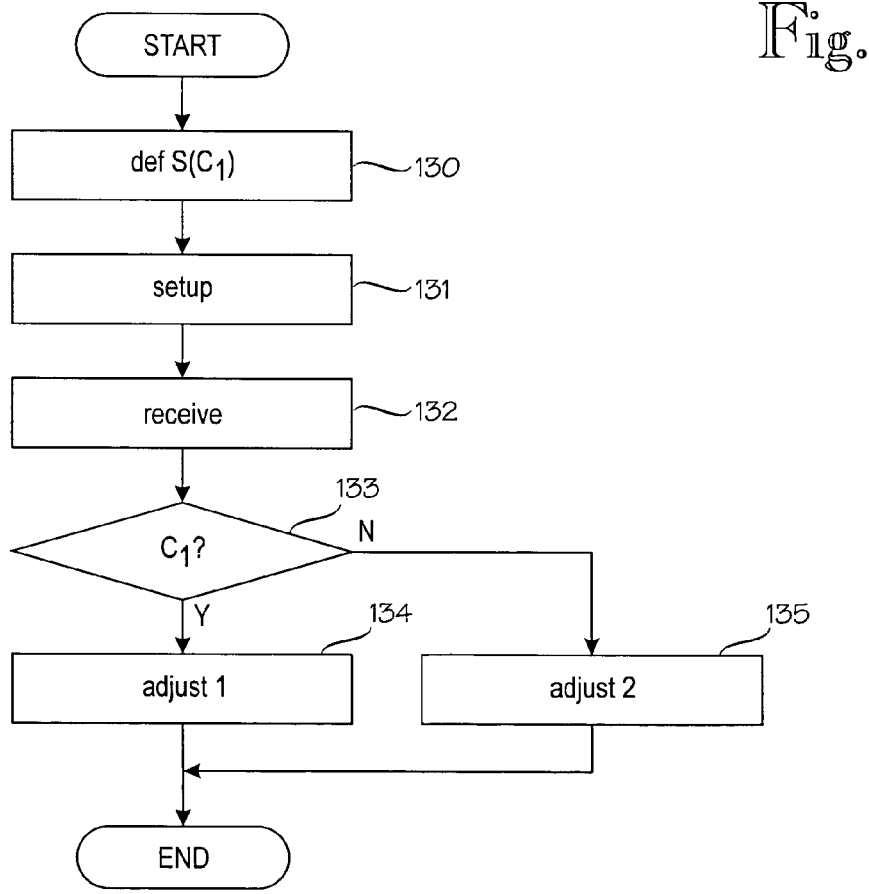
FIG. 13 illustrates the basic steps of a method according to an embodiment of the present invention.

FIG. 13 illustrates the basic steps of a method according to an embodiment of the present invention. In step 130 an optimization scheme for the reception with two separately controlled antennas is defined. The optimization scheme comprises one or more conditions that may be checked on reception at defined instances. A defined instance may, at the minimum, correspond to an occurrence of a timeslot, which means that an adjustment on the frequencies in either of the paths may be implemented on a per timeslot basis. For a person skilled in the art it is clear, however, that also other intervals or definitions are possible, for example adjustments may be made on a per frame basis. The adjustments may also be related to the stages of connection setup, whereafter they stay adjusted until the end of the connection.

In step 131 the mobile station initiates a connection setup, and negotiates with the network a number of timeslots for allocation. After the negotiation is performed, in step 132 the mobile station receives a transmitted signal with two receiver paths. In step 133 the transmission is checked against the one or more conditions set out in the optimization step 130. If the predefined condition is fulfilled, a corresponding adjustment is made in step 134. If not, a second adjustment is made in step 135. It should be noted that either of the first and second adjustments may also be comprise a decision of making no adjustment. In the exemplary embodied method the adjustment is made at connection setup as a result of checking only one condition. For a person skilled in the art it is clear that the optimization scheme may comprise several conditions that may be monitored at any time during the connection.

For example, the optimization scheme may comprise measuring of the power level of the received signals via both of the branches. If either of the signals is clearly stronger (c1: P1>P2, where P corresponds to a power level of the received signal), the adjustment comprises using the information in the timeslot of the stronger signal (adjust1='use the timeslot of first receiving path' and adjust2='use timeslot of the second receiving path'). This kind of condition provides for optimized antenna hopping (FIG. 10) and, by means of reduced number of required retransmissions, improves the data throughput of the reception. Such basic scheme may be enhanced by additional conditions, for example adjusting the antenna hopping to be used for defined types of channels.

As another example, as discussed above the optimization scheme may comprise checking whether the timeslots allocated to the connection coincide in time or not. If the timeslots do not coincide in time, the local oscillators may be adjusted to the same receiving frequency (f1=f2) for diversity reception. If the timeslots do coincide in time, the local oscillators may be adjusted to different frequencies (f1≠f2) for multicarrier reception. In its simplest form this means that cond1='timeslots coincide?', wherein adjust1 corresponds to f1≠f2, and adjust2 corresponds to f1=f2. This kind of condition provides for the combined diversity and dual carrier configuration of FIG. 12.

It will be obvious to a person skilled in the art that, as the technology advances, the inventive concept can be implemented in various ways. The invention and its embodiments are not limited to the examples described above but may vary within the scope of the claims.

The invention claimed is:

1. A user terminal comprising:
   a first receiver part adjustable to a defined carrier band, wherein the carrier band is arranged to carry a cyclic set of consecutive time slots;
   a second receiver part adjustable to a defined carrier band, wherein the carrier band is arranged to carry a cyclic set of consecutive time slots and the first and the second receiver parts are separately operable;
   a processor configured to allocate to a radio channel at least a first timeslot and a second timeslot, wherein the first timeslot and the second timeslot may belong to different carrier bands of a subdivided frequency band and the processor is configured to check whether the first and second timeslots coincide in time and adjust the allocation of the first and second receiver to the different carrier bands in response thereto; and
   a first oscillator and a second oscillator configured to adjust, respectively, the first receiver part and the second receiver part to the carrier bands of the first timeslot and of the second timeslot based on at least one condition that is checked at a predefined instance during the allocation of the radio channel.

2. A user terminal according to claim 1, wherein each of the first and the second receiver parts comprise an antenna, a voltage controlled oscillator and a mixer for mixing the feeds from the antenna and the voltage controlled oscillator and thereby outputting a signal corresponding to the defined carrier band.

3. A user terminal according to claim 2, wherein the first receiver part further comprises a second mixer coupled to the voltage controlled oscillator and the antenna of the second receiver part.

4. A user terminal according to claim 1, wherein the first timeslot and the second timeslot may coincide in time.

5. A user terminal according to claim 1, wherein the processor is configured to determine the receiver part with higher signal level of one carrier band.

6. A user terminal according to claim 5, wherein the first and second oscillators are arranged to utilize a signal from the receiver part determined to have higher signal level.

7. A user terminal according to claim 1, wherein the first and second oscillators respectively adjust the first receiver part and the second receiver part to the same carrier band at a time when the timeslots allocated to the connection do not coincide in time.

8. A user terminal according to claim 1, wherein the first and second oscillators respectively adjust the first receiver part to the carrier band of the first timeslot and the second receiver part to the carrier band of the second timeslot at a time when the timeslots coincide in time.

9. A method comprising:
   dividing a frequency band into one or more carrier bands, each carrier band arranged to carry a cyclic set of consecutive time slots;
   allocating to a radio channel of the frequency band at least a first timeslot and a second timeslot, wherein the first timeslot and the second timeslot may belong to different carrier bands;
   receiving transmission on the radio channel with a radio equipment comprising a first receiver and a second receiver, wherein the first receiver and the second receiver are separately controllable; and
   adjusting the first receiver and the second receiver to the respective carrier bands of the first timeslot and of the second timeslot based on a) whether the timeslots allocated to the radio channel coincide in time and b) at least one condition that is checked at a predefined instance during the allocation of the radio channel.

10. An apparatus comprising:
    allocation means for allocating to a radio channel at least a first timeslot and a second timeslot, wherein the first timeslot and the second timeslot may belong to different carrier bands and each carrier band is arranged to carry a cyclic set of consecutive time slots and wherein the first and second timeslots are checked to determine whether the first and second timeslots coincide in time;
    receiving means for receiving transmission on the radio channel comprising a first receiver and a second receiver, wherein the first receiver and the second receiver are separately controllable and are allocated to the different carrier bands in response to whether the first and second timeslots coincide in time; and
    adjustment means for adjusting the first receiver and the second receiver to the respective carrier bands of the first timeslot and of the second timeslot according to at least one condition that is checked at a predefined instance during the allocation of the radio channel.

11. A network element comprising:
    allocation means for allocating to a radio channel at least a first timeslot and a second timeslot, wherein the first timeslot and the second timeslot may belong to different carrier bands and each carrier band is arranged to carry a cyclic set of consecutive time slots and wherein the first and second timeslots are checked to determine whether the first and second timeslots coincide in time;

a radio equipment comprising a first receiver and a second receiver, wherein the first receiver and the second receiver are separately controllable and are allocated to the different carrier bands in response to whether the first and second timeslots coincide in time; and adjustment means for adjusting the first receiver and the second receiver to the respective carrier bands of the first timeslot and of the second timeslot according to at least one condition that is checked at a predefined instance during the allocation of the radio channel.

12. A method according to claim 9, further comprising outputting a signal corresponding to the defined carrier band for each of the first and second receivers.

13. A method according to claim 9, wherein the first timeslot and the second timeslot coincide in time.

14. A method according to claim 9, wherein adjusting the first receiver and the second receiver includes determining the receiver having a higher level of signal power.

15. A method according to claim 14, wherein adjusting the first receiver and the second receiver includes utilizing the signal from the receiver determined to have the higher level of signal power.

16. A method according to claim 9, wherein adjusting the first receiver and the second receiver includes adjusting the first receiver and the second receiver to the same carrier band at a time when the timeslots allocated to the connection do not coincide in time.

17. A method according to claim 9, wherein adjusting the first receiver and the second receiver includes adjusting the first receiver to the carrier band of the first timeslot and the second receiver to the carrier band of the second timeslot at a time when the timeslots coincide in time.

* * * * *